United States Patent
Kawakami et al.

(10) Patent No.: US 6,356,302 B1
(45) Date of Patent: Mar. 12, 2002

(54) APPARATUS FOR MEASURING S/N RATIO OF COMPOSITE VIDEO SIGNAL

(75) Inventors: Yasuo Kawakami; Koji Shibata; Yutaka Miyahara; Tadao Nuka, all of Kawagoe (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/166,796

(22) Filed: Oct. 6, 1998

(30) Foreign Application Priority Data

Oct. 7, 1997 (JP) .............................................. 9-274219

(51) Int. Cl.$^7$ ............................................. H04N 17/00
(52) U.S. Cl. ....................................... 348/193; 348/607
(58) Field of Search ................................ 348/193, 192, 348/725, 726, 705, 706, 607, 731; H04N 17/00, 5/21, 5/44, 5/268

(56) References Cited

U.S. PATENT DOCUMENTS

| | | | |
|---|---|---|---|
| 4,402,013 A | 8/1983 | Wargo | 358/160 |
| 4,682,230 A | 7/1987 | Perlman et al. | 358/167 |
| 5,073,822 A | 12/1991 | Gunn et al. | 358/139 |
| 5,335,010 A | 8/1994 | Lindemeier et al. | 348/706 |
| 5,777,693 A | 7/1998 | Kishigami et al. | 348/731 |

FOREIGN PATENT DOCUMENTS

WO    WO 97/09792    3/1997    ............ H04B/1/10

OTHER PUBLICATIONS

Patent Abstracts of Japan vol. 13, No. 142 (E-739), Apr. 7, 1989 & JP 63 304728 A (Mitsubishi Electric Corp) Dec. 13, 1988 *Abstract.

Patent Abstracts of Japan vol. 96, No. 10, Oct. 31, 1996 & JP 08 149060 A (Matsushita Electric Ind Co) Jun. 7,1996 *Abstract.

Patent Abstracts of Japan vol. 96, No. 6, Jun. 28, 1996 & JP 08 051573 A (Toshiba Corp) Feb. 20, 1996 *Abstract.

Patent Abstracts of Japan vol. 14 No. 414 (E-975) Sep. 7, 1990 & JP 02 159886 A (Clarion Co Ltd) Jun. 20, 1990 *Abstract.

*Primary Examiner*—Sherrie Hsia
(74) *Attorney, Agent, or Firm*—Sughrue Mion, PLLC (57) ABSTRACT

An S/N ratio measuring method of a video signal which is suitable for the formation of an IC and can precisely detect a fluctuation of an S/N ratio of a video signal at high response speed while suppressing the total cost and a system based on this method. In operation, a composite video signal is received, a noise density in a predetermined period of the composite video signal is detected, and an S/N ratio of a video signal included in the composite video signal is recognized basis on the detected noise density. The S/N ratio measuring system has a demodulator for demodulating the composite video signal from the reception signal and a counter for counting noises which are generated in a predetermined period of time of the composite video signal and recognizes the S/N ratio of the video signal included in the composite video signal based on a count value obtained.

2 Claims, 6 Drawing Sheets

FIG.1

FIG.2A — VERTICAL SYNC SIGNAL WITH LITTLE NOISES

FIG.2B — VERTICAL SYNC SIGNAL WITH MUCH NOISES

APPARATUS FOR MEASURING S/N RATIO OF COMPOSITE VIDEO SIGNAL

BACKGROUND OF THE INVENTION

1. Field of the Invention

The present invention generally relates to method and system for measuring the S/N ratio of a television (TV) signal or a video signal. The invention also relates to a system for executing a process according to a result of measurement of the S/N ratio.

2. Description of Related Art

Among techniques for measuring the S/N ratio of a TV signal transmitted via radio wave or a wire, there is for example is a technique configured such that a detection output of a video signal in a received TV signal is integrated and its integration output level is checked, It is a general way to fundamentally detect an average noise level or an information signal level in a demodulation output of the video signal.

In the measurement based on the average level detection, it cannot be, however, always said that the S/N ratio can be detected accurately in accordance with a fluctuation in an actual S/N ratio and the fluctuation in the S/N ratio can be captured at a high response speed. In many cases, there is a tendency such that a circuit for the measurement is complicated and the cost increases.

When performing a process which needs to be performed precisely in accordance with the fluctuation of the S/N ratio and at a high response speed, for example, a diversity process as an anti-multipath method in a television receiving system, therefore, even if a conventional S/N ratio measuring technique is applied, the system cannot be successfully adapted to a reception environment or a large-scale circuit for successful adaptation is necessary.

More specifically, when detecting the existence of noises, amplitude components of the noises are usually extracted as amplitude information by a method of detection (rectification and smoothing) or the like. If a method of limiting a frequency component by a high pass filter or the like is included in the detection process, frequency information will be also included in addition to the amplitude information. In the S/N ratio measurement, to be exact, the level (amplitude information) of noises when a signal S is at a constant level has to be extracted.

When obtaining information according to the S/N ratio in order to realize the diversity method, if it is intended to obtain the level information of the noises by methods of rectification and smoothing or the like, it is difficult to manage parameters regarding level information such as gain, threshold value, and the like in the rectifying and smoothing circuit. In other words, the circuit has to be strictly set with respect to a variation in component elements, temperature characteristics, and the like of the circuit.

Consequently, there arise cases where the circuit is enlarged in scale and complicated and the adjustment is unavoidable on a product. In addition, the circuit also has an aspect such that there are many disadvantages in mounting of parts onto a circuit board due to the necessity of a smoothing capacitor and the like.

OBJECT AND SUMMARY OF THE INVENTION

The invention is, therefore, made in view of the foregoing drawbacks and it is an object of the invention to provide a method of measuring an S/N ratio of a video signal, in which it is suitable for realization of an IC and a fluctuation in an S/N ratio of a television signal or a video signal can be accurately detected at a high response speed while suppressing a total cost and to provide a system based on the method.

According to the invention, there is provided a method of measuring an S/N ratio of a composite video signal, wherein the composite video signal is received, a noise density in a predetermined period of the composite video signal is detected, and the SIN ratio of the composite video signal is recognized based on the detected noise density.

According to the invention, there is provided another method of measuring an S/N ratio of a composite video signal, wherein the composite video signal is received, noises occurring in a predetermined period of the composite video signal are counted, and the S/N ratio of the composite video signal is recognized based on a count value obtained by the counting operation.

In each of the methods, the predetermined period can be set within a generating period of a vertical sync signal.

According to the invention, there is provided a system for measuring an S/N ratio of a composite video signal, comprising: demodulating means for demodulating the composite video signal from a reception signal; and counting means for counting noises occurring in a predetermined period of the composite video signal, wherein the S/N ratio of the composite video signal is recognized based on a count value obtained by the counting means.

In the system, the predetermined period can be set within a generating period of the vertical sync signal.

According to the invention, there is provided another system for measuring an S/N ratio of a composite video signal and executing a process according to a measurement result, comprising: S/N ratio measuring means for receiving the composite video signal, counting noises occurring in a predetermined period of the composite video signal, and recognizing the S/N ratio of the composite video signal based on a count value obtained by the counting operation; and control means for executing a control according to the S/N ratio obtained by the S/N ratio measuring means.

According to the invention, there is provided further another system for measuring an S/N ratio of a composite video signal and executing a diversity process according to a measurement result, comprising: S/N ratio measuring means for receiving the composite video signal, counting noises occurring in a predetermined period of the composite video signal, and recognizing the S/N ratio of the composite video signal based on a count value obtained by the counting operation; and control means for executing a diversity process in accordance with the S/N ratio obtained by the S/N ratio measuring means.

The still another system further comprises switching means for selectively switching reception of outputs from a plurality of receiving antennas, wherein the control means can generate an instruction for switching the selection of the receiving antenna in accordance with the recognized S/N ratio to the switching means.

DETAILED DESCRIPTION OF THE PREFERRED EMBODIMENTS

Embodiments of the invention will now be described in detail hereinafter with reference to the accompanying drawings.

Figure 1:
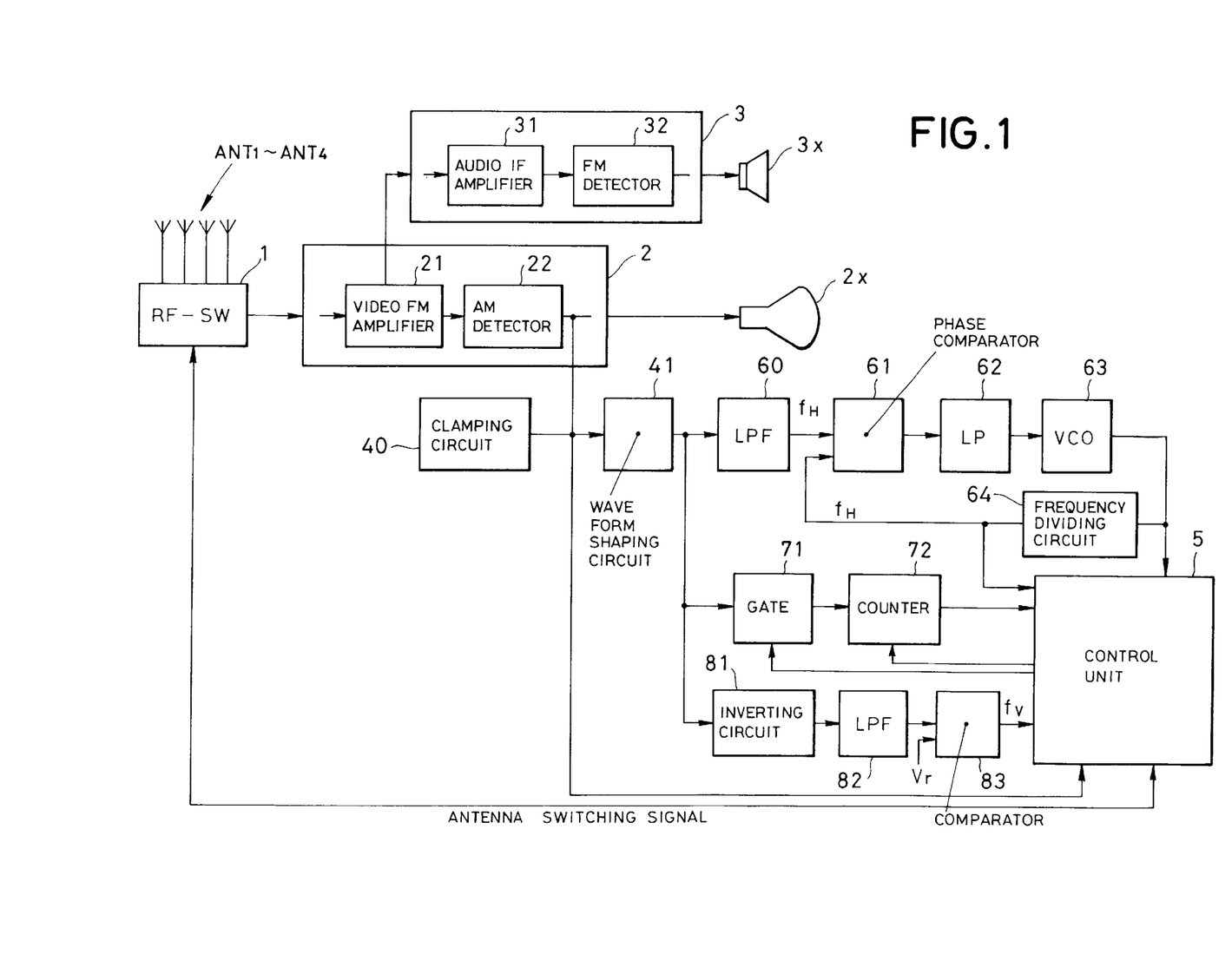
FIG. 1 is a block diagram schematically showing the structure of a television receiver of an embodiment according to the invention.

FIG. 1 schematically shows the structure of a television receiver of an embodiment according to the invention.

In FIG. 1, the receiver is a type which is used while being moved like, for example, a vehicle-mounted receiver and has four receiving antennas ANT1 to ANT4 for realizing a space diversity or are connected to reception signal output terminals of the antennas. Each antenna is electrically connected to a switch (RF-SW) 1. The switch 1 selects one of reception outputs of the four antennas and supplies an RF (Radio Frequency) signal from the selected antenna as a reception signal to a video signal reproducing system 2. The video signal reproducing system 2 includes: a tuner (not shown) which serves as demodulating means and as a front end for converting the reception signal from the switch 1 into an intermediate frequency signal; a video intermediate frequency amplifier 21 for amplifying the intermediate frequency signal; and an AM detector 22 for AM (Amplitude Modulation) demodulating the intermediate frequency signal amplified by the amplifier 21 and reproducing a composite video signal. The composite video signal is supplied to a CRT (Cathode-Ray Tube) 2x as a display via various reproducing circuits and amplifying circuits (not shown). The CRT 2x displays an image according to the composite video signal. As a display, besides the CRT, a liquid crystal display or the like can be also used.

In the reception signal which is supplied to the video intermediate frequency amplifier 21, in addition to the video signal, an audio signal is also included. An audio intermediate frequency signal is extracted by the video intermediate frequency amplifier 21 and is supplied to an audio signal reproducing system 3. The audio signal reproducing system 3 comprises: an audio intermediate frequency amplifier 31 for amplifying the audio intermediate frequency signal; and an FM detector 32 for FM (Frequency Modulation) demodulating the intermediate frequency signal amplified by the amplifier 31 and reproducing a composite audio signal. The composite audio signal is supplied to a speaker 3x as a sound output unit via various reproducing circuits and amplifying circuits (not shown). The speaker 3x generates a sound pressure according to the composite audio signal.

The composite video signal from the video signal reproducing system 2 is supplied to a waveform shaping circuit 41 and a control unit 5 while the level of a sync chip of the composite video signal is made constant by a clamping circuit 40.

The waveform shaping circuit 41 removes a portion (hereinafter, also referred to as "video signal" appropriately) showing pure video information from the supplied composite video signal, generates a composite sync signal including only various sync signals and a blanking signal, and supplies the composite sync signal to a low pass filter (LPF) 60. A component of 2 fH (fH denotes a horizontal sync frequency) by an equivalent pulse in the composite sync signal is eliminated by the LPF 60 and a high frequency component of the composite sync signal is attenuated. A signal according to the frequency component of fH is, therefore, derived from an output of the LPF 60. The output of the LPF 60 is supplied to one input terminal of a phase comparator 61. The phase comparator 61 compares one of input signals with the other input signal and generates a phase difference signal corresponding to a phase difference between them to an LPF 62. The phase difference signal transmitted through the LPF 62 is supplied as a control signal to a VCO (Voltage-Controlled Oscillator) 63. The VCO 63 has a center frequency of 32 fH, oscillates a signal by deviating the frequency from the center frequency in accordance with the control signal supplied, and supplies an oscillation output signal to the control unit 5 and a frequency divider 64. The frequency divider 64 divides the frequency of the oscillation output signal from the VCO 63, generates a signal having a frequency of fH, and supplies the signal to the control unit 5 and the other input terminal of the phase comparator 61. The phase comparator 61, LPF 62, VCO 63, and frequency divider 64 form what is called a phase locked loop (PLL) and generate a clock signal which follows the horizontal sync frequency of the received composite video signal and is synchronized with the horizontal sync signal of the composite video signal.

The composite sync signal from the waveform shaping circuit 41 is also supplied to a gate circuit 71. In response to a gate control signal from the control unit 5, the gate circuit 71 transmits the composite sync signal to a counter 72 serving as counting means or, contrarily, shuts off. A clear signal is supplied from the control unit 5 to the counter 72. Simultaneously with that the counter is set to an outputting state by the gate control signal from the control unit 5, a clear (reset) state of the counter 72 is cancelled and the counter enters a countable state, executes the counting operation based on the composite sync signal from the gate circuit 71, and sends a count value to the control unit 5.

Further, the composite sync signal from the waveform shaping circuit 41 is supplied to an inverting circuit 81. The composite sync signal inverted by the inverting circuit 81 is supplied to one input terminal of a level comparator 83 through an LPF 82. The comparator 83 compares an output signal of the LPF 82, namely, an integration output of the composite sync signal with a reference voltage level Vr. Only when the output signal of the LPF 82 is larger than the reference voltage level Vr, the comparator 83 generates a signal at a high level and supplies it to the control unit 5. Since the generated high level signal has a frequency (fV) that is equal to that of the vertical sync signal, the vertical sync signal is detected from the composite sync signal by the inverting circuit 81, LPF 82, and comparator 83 (hereinafter, an output signal of the comparator 83 is called an equivalent vertical sync signal).

A main section of S/N ratio measuring means is formed by the video signal reproducing system 2, clamping circuit 40, waveform shaping circuit 41, gate circuit 71, counter 72, and control unit 5.

The control unit 5 is constructed by a microcomputer or the like and controls each section of the receiver based on the supplied signals and the given information. A control to execute a process for measuring the S/N ratio of the video signal and a process for selecting the optimum receiving antenna based on the measured S/N ratio is included in the above control. In the selecting process of the antenna, the control unit 5 supplies an antenna switching signal to the switch 1. The switch 1 relays an output of any one of the antennas ANT1 to ANT4 to the video signal reproducing system 2 in accordance with the antenna switching signal.

The S/N ratio measuring operation of the video signal which is executed in the receiver will now be described.

Figure 2A:
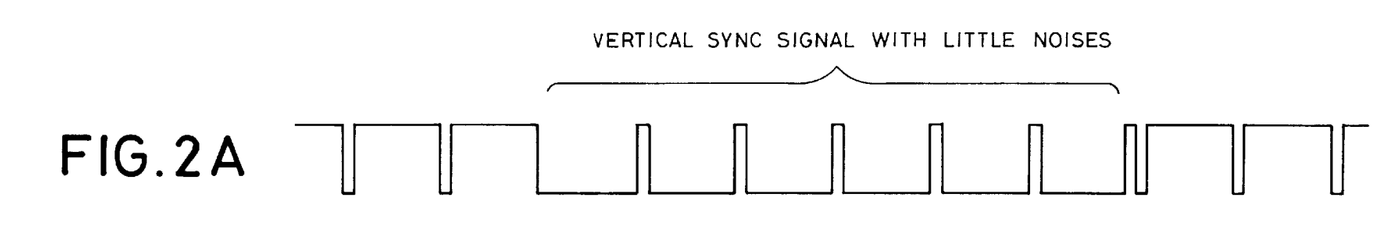
FIGS. 2A and 2B are waveform diagrams showing the state of occurrence of noises which appear in a vertical sync signal of a composite video signal received by the receiver of FIG. 1.
Figure 2B:
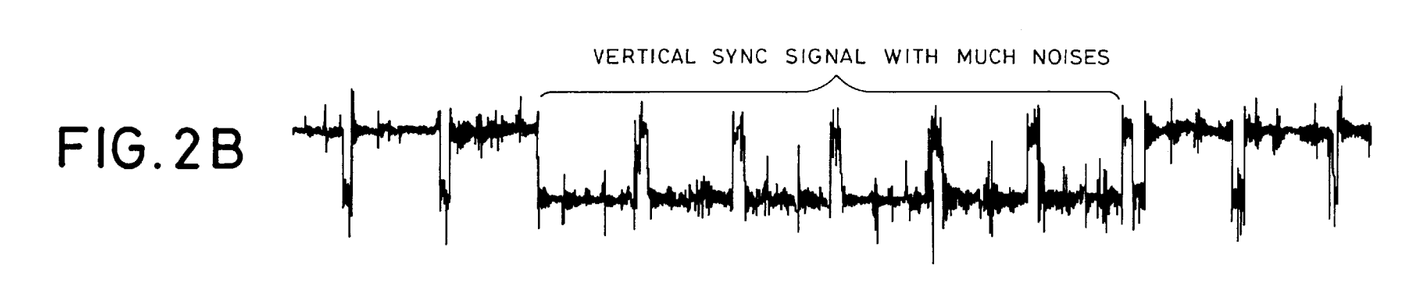

Fundamentally, the receiver measures an S/N ratio based on an occurrence frequency of noises which appear in the vertical sync signal of the composite video signal, namely, a noise density. That is, although the vertical sync signal which is derived from the composite sync signal having the video signal of a large value of the S/N ratio as shown in FIG. 2A has a small amount of noises, the vertical sync signal which is obtained from the composite sync signal having the video signal of a small value of the S/N ratio as shown in FIG. 2B has a large amount of noises and has many steep level fluctuations. To detect the noise density, therefore, the receiver counts the number of noises occurring in a predetermined period in the vertical sync signal and recognizes a count value as a value of the S/N ratio of the video signal.

Figure 3:
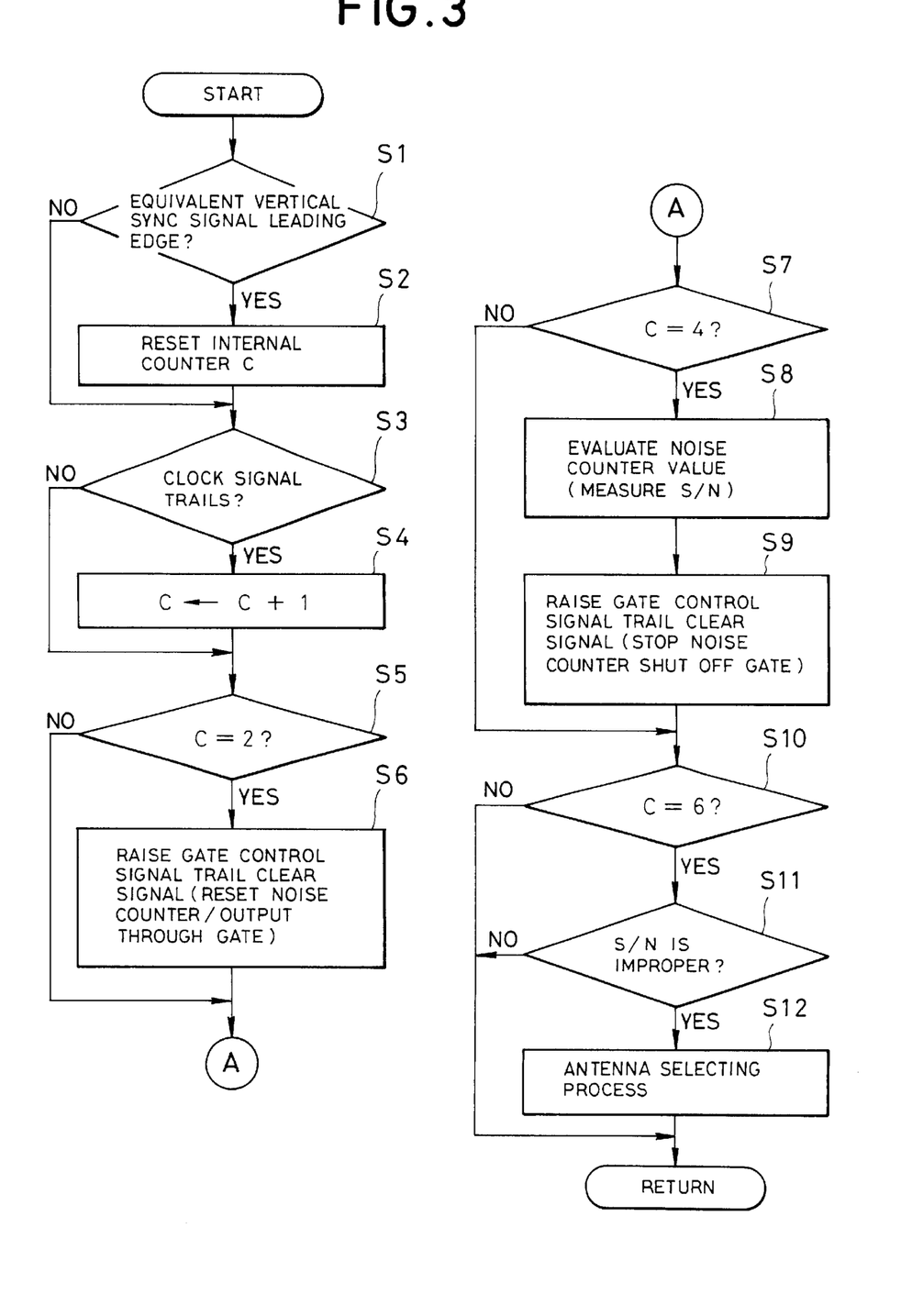
FIG. 3 is a flowchart showing a procedure for an S/N ratio measuring process and an S/N ratio responding process which are executed by a control unit in the receiver of FIG. 1.

Specifically speaking, the control unit 5 executes processes as shown in FIG. 3.

In FIG. 3, the control unit 5 discriminates whether a leading edge of an equivalent vertical sync signal supplied from the comparator 83 has been generated or not (step S1). As shown in FIGS. 4A to 4D, the equivalent vertical sync signal is a signal such that the composite sync signal from the waveform shaping circuit 41 is inverted by the inverting circuit 81, its inversion output is integrated by the LPF 82, and when an output signal of the LPF 82 exceeds the reference voltage level Vr, the signal is set to the high level. In the composite sync signal, therefore, the equivalent vertical sync signal rises soon after the start of the generation of the vertical sync signal and the control unit 5 detects this leading edge.

Figure 4A:
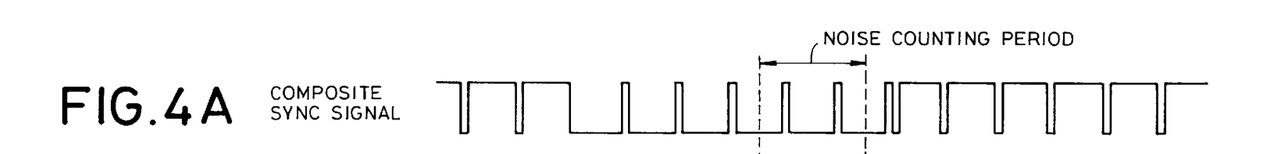
FIGS. 4A to 4H are time charts showing the operating state of each unit in the receiver corresponding to the processes shown in FIG. 3.
Figure 4B:
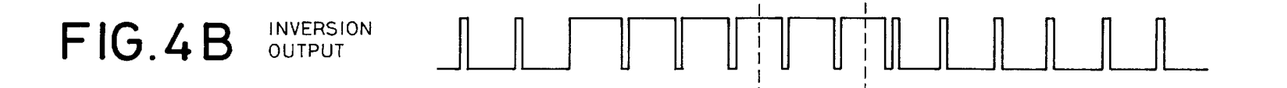
Figure 4C:
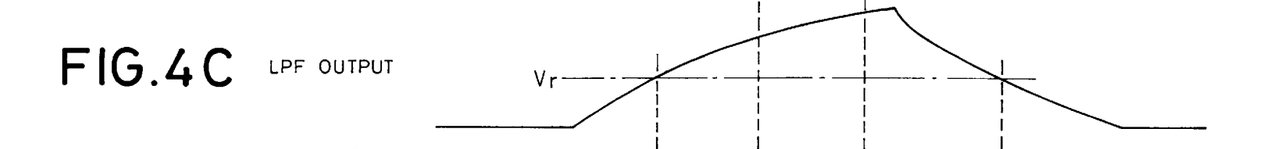
Figure 4D:
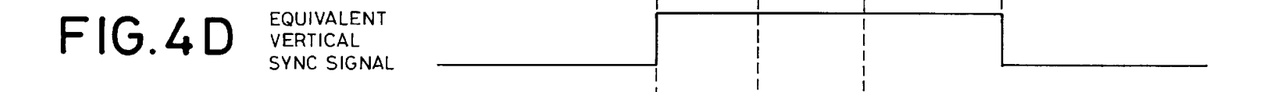
Figure 4E:
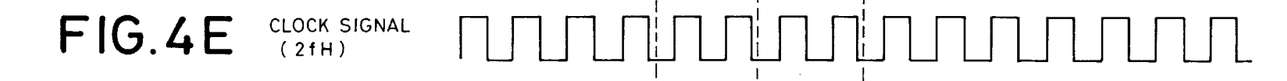
Figure 4F:
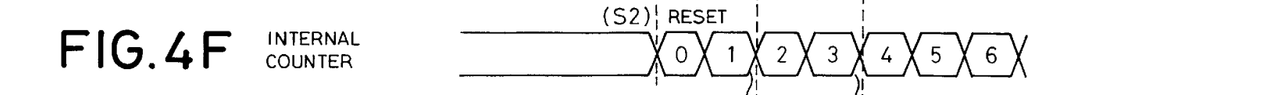

When the leading edge of the equivalent vertical sync signal is detected, the control unit 5 resets an internal counter (not shown) C (step S2; refer to FIG. 4F). The control unit 5 subsequently discriminates whether a clock signal has trailed or not (step S3). When the trailing edge is detected, the control unit 5 counts up the internal counter C (step S4). The clock signal as a target of discrimination is a signal having a frequency of 2 fH as shown in FIG. 4E and is a signal formed in a manner such that the clock signal which is supplied from the VCO 63 and has a frequency of 32 fH and is synchronized with a horizontal sync signal of the received composite video signal is frequency divided in the control unit 5. When the trailing edge of the clock signal is not detected in step S3, the count-up operation in step S4 is not performed. In steps S3 and S4, the count value of the internal counter C is increased by "1" in response to the trailing edge of the clock signal of 2 fH (refer to FIG. 4F).

After the step S3 or step S4, the control unit 5 discriminates whether the count value of the internal counter C is equal to 2 or not (step S5). If the result is YES, the control unit 5 raises the gate control signal to the gate circuit 71 to the high level and trails the clear signal to the noise counter 72 to the low level, and if NO, the control unit 5 does not perform the above processes (step S6; refer to FIGS. 4F and 4G). When the gate control signal is raised, the gate circuit 71 is set to an outputting state. When the clear signal is set to the low level, the noise counter 72 is set to a countable state from the clear state (namely, count value of 0).

Figure 4G:
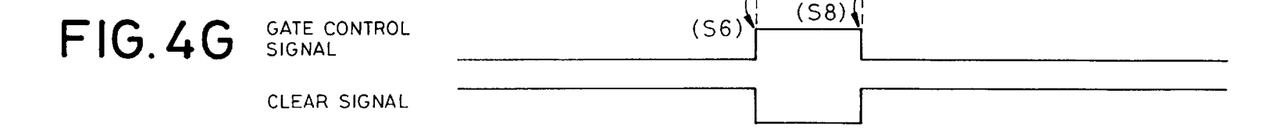

The control unit 5 further discriminates whether the count value of the internal counter C is equal to 4 or not (step S7). If the result is YES, the control unit 5 evaluates the count value of the noise counter 72 and calculates a value of the S/N ratio of the video signal based on the count value (step S8), trails the gate control signal to the low level, and raises the clear signal (step S9). The control unit 5, thus, recognizes the S/N ratio, the gate circuit 71 is shut off, and the noise counter 72 is made inoperative. After step S8, the count value of the noise counter 72 is evaluated and a value of the S/N ratio of the video signal based on the count value is calculated. If the count value of the internal counter C is not equal to 4 in step S7, the processes in steps S8 and S9 are not executed.

Figure 4H:
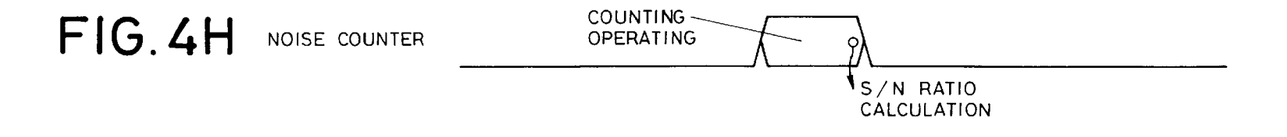

FIG. 4H shows the period of execution of the operation of the counter 72 shown in FIG. 1. At around the end of this period, that is, when the value of the internal counter C shown in FIG. 4F equals 4, the control unit 5 performs the calculation of the S/N ratio. The operation of the control part 5 is described above in the operations at steps S7 and S8.

After the S/N ratio has been calculated, the control unit 5 discriminates whether the count value of the internal counter C is equal to 6 or not (step S10). If the result is YES, a check is made to see if the calculated value of the S/N ratio is improper (step S11). For example, it is discriminated by checking whether the recognized S/N ratio is larger than a specified value or not. If the value of the S/N ratio is improper as a result of the discrimination, the control unit 5 executes the antenna selecting process (step S12). The antenna selecting process is accomplished by a method whereby the control unit 5 generates an antenna switching signal to the switch 1 at a predetermined timing and the switch 1 is controlled so as to select an antenna which can receive a broadcasting wave better than that of the antenna selected at present.

The processes of a series of steps shown in FIG. 3 are executed based on the clock signal of 32 fH which is supplied from the VCO 63 to the control unit 5, more specifically speaking, every period of the clock signal.

Figure 5:
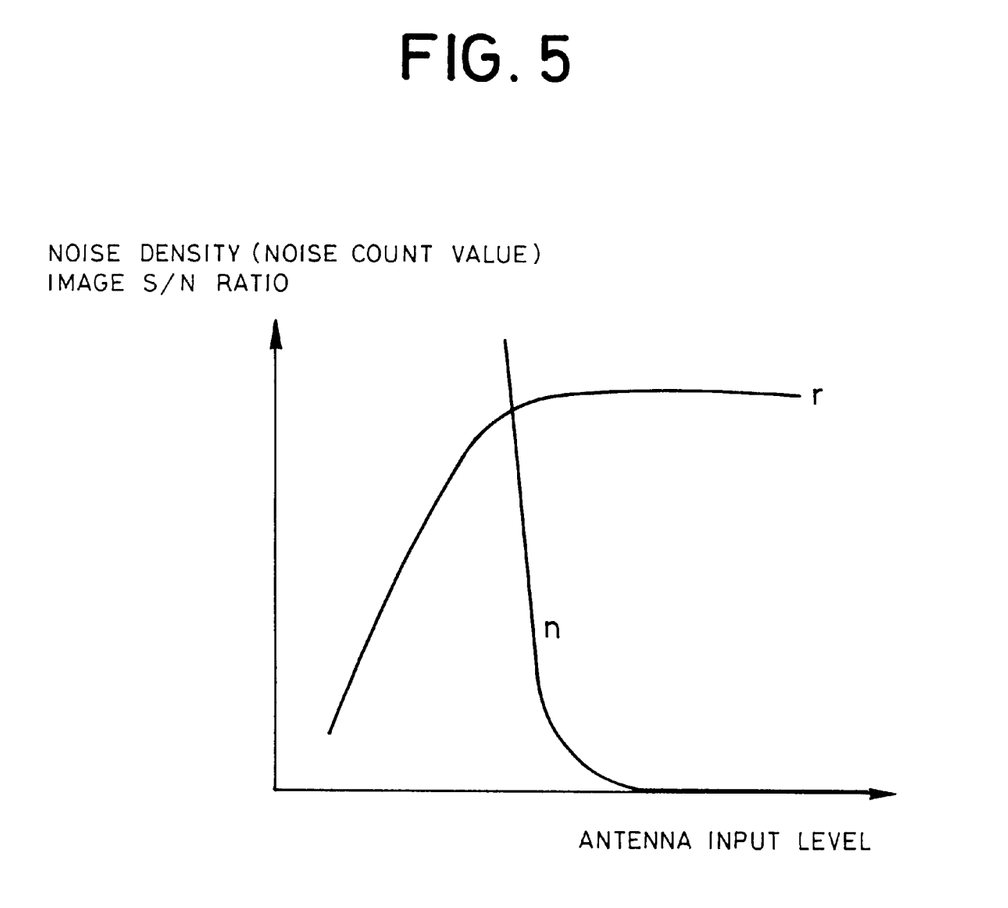
FIG. 5 is a graph showing the relation between a noise density of the composite video signal and an S/N ratio of an image.

The calculation of the S/N ratio in step S8 can be performed based on a correlation between the noise density (count value of the noise counter 72) and the image S/N ratio shown in FIG. 5. As will be understood from FIG. 5, a change in noise density "n" when an image S/N ratio "r" deteriorates is relatively large. It can be said, therefore, that a change in image S/N ratio "r" can be easily precisely detected by the noise density.

In the embodiment, accordingly, since the S/N ratio of the video signal is measured based on the occurrence frequency of the noises which appear in the vertical sync signal of the composite video signal, namely, based on the noise density, the fluctuation of the S/N ratio of the video signal can be precisely detected at a high response speed. For example, the foregoing space diversity operation can be, consequently, extremely preferably made trace the fluctuation of the S/N ratio.

Moreover, since the counter which inputs a binary signal can be used for measurement of the noise density, the S/N ratio can be measured by a simple construction, it is suitable for realizing an IC, and a construction which can contribute to the reduction of the total costs can be obtained. Explanation will be made in more detail with respect to this point. The method of the embodiment can be regarded as a digital type method wherein the existence of the noises of the composite video signal is counted by the counter each time the noises are generated. Although it can be regarded as a digital method, since the method only uses a process in which the composite video signal is binarized and is fed to the counter in the form of binary values (the process does not use an A/D conversion), amplitude information is lost and only the frequency information (or noise density) is extracted instead of the amplitude component of the noises. In the system such as a diversity system, however, it is often sufficient to have a certain extent of accuracy even if the extremely precise S/N ratio is not measured. The embodiment, accordingly, has the construction using the counter as mentioned above by setting importance on the response speed and the reduction of cost.

In the embodiment, although the noises occurring in the predetermined period (high level period of time of the gate control signal) of the vertical sync signal are counted, fundamentally, it is possible to measure the S/N ratio by counting the noises which are generated in an arbitrary predetermined period so long as it is within a vertical blanking period. That is, since the video signal showing the image information exists in the portions other than the vertical blanking period, the generated noises cannot be certainly counted. So long as it is within the vertical blanking period, however, the video signal does not exist and the generated noises can be certainly counted. Since there is also a case of superimposing a digital signal within the vertical blanking period in dependence on a broadcasting wave, in such a case, it is necessary to set a predetermined period in consideration of the digital signal. It is particularly desirable to use the vertical sync signal period in which noises can be easily detected.

Figure 6:
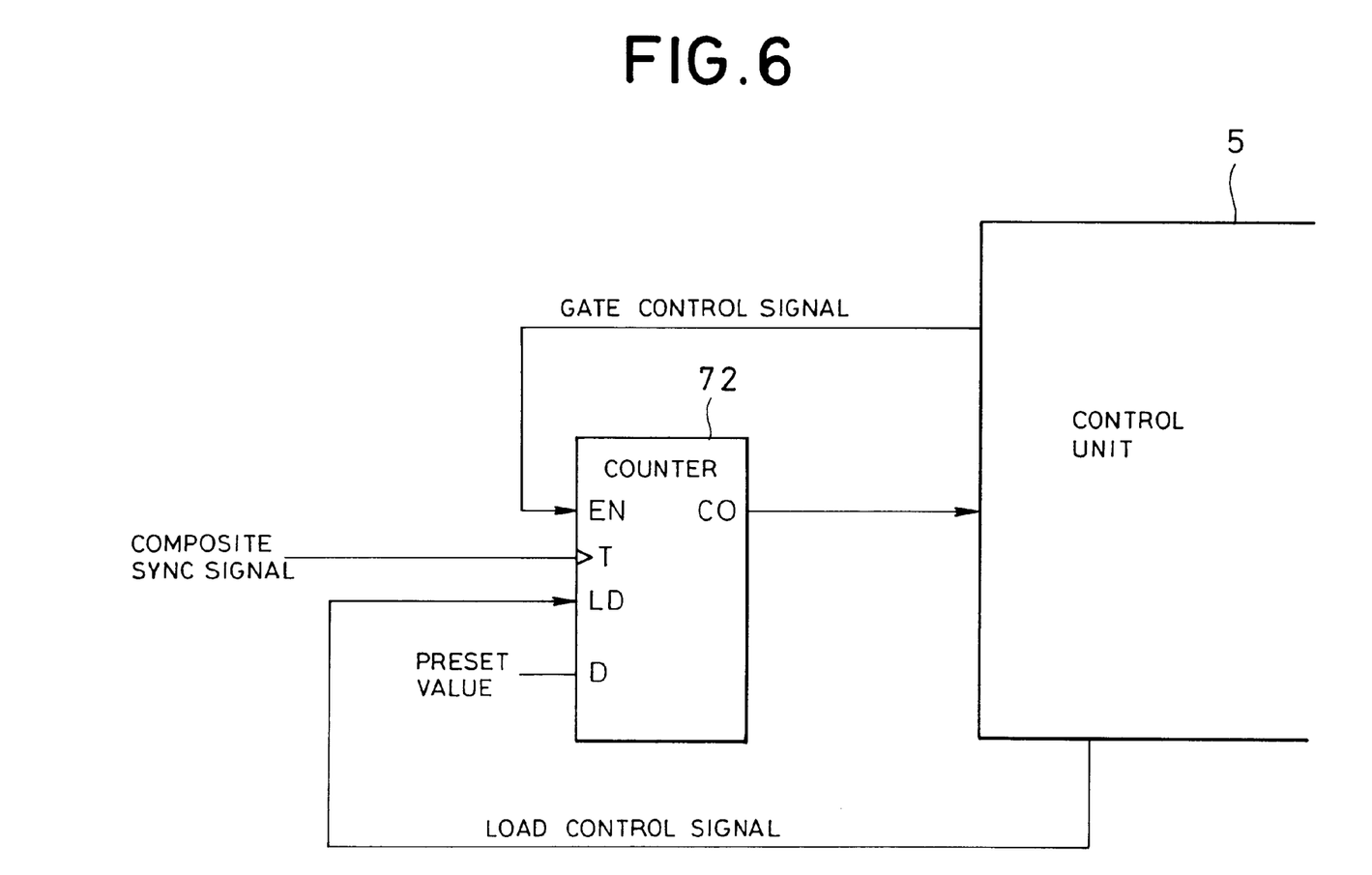
FIG. 6 is a block diagram showing a modification of a noise counter and its peripheral circuits in the receiver of FIG. 1.

Although the noise counter and its periphery parts have a structure shown in FIG. 1 in the described embodiment, such an arrangement as shown in FIG. 6 can be also used.

In FIG. 6, the composite sync signal from the waveform shaping circuit 41 is directly supplied to a trigger input of the noise counter 72, the gate control signal from the control unit 5 is supplied to an enable input, and the load control signal is supplied from the control unit 5 to a load input. A signal corresponding to a preset value (for example, fixed value) is supplied to a data input of the counter 72 and a carry output of the counter 72 is supplied to the control unit 5.

In the above-described construction, simultaneously with that the counter 72 is switched to the operative mode in response to the gate control signal, a load control signal is generated from the control unit 5 and a preset value is loaded (preset) as an initial count value of the counter 72. The counter 72, thus, starts to count the noises of the composite sync signal from the preset value and, after that, when a count value exceeds the maximum count value of the counter 72 and overflows, the counter supplies a carry output to the control unit 5.

When the preset value is a large value, the carrier output is generated at a small number of times of counting. When the preset value is a small value, contrarily, the carry output is generated at a larger number of times of counting. That is, the carry output is generated when the noises of the composite sync signal are generated larger than the number of counting times (the maximum count value−preset value) which is determined by the preset value. By the carry output, the control unit 5 can immediately recognize the improper S/N ratio state.

In the embodiment, further, although the space diversity operation has been mentioned as an operation which responds to the measured S/N ratio, the invention can be also applied to another diversity operation. The invention can be obviously applied to the S/N ratio responding operation other than those diversity operations.

Although the various means have been described above in the embodiment, many variations and modifications of the invention are possible within the scope of the invention which can be designed by those skilled in the art.

According to the invention as described in detail above, the S/N ratio measuring method of the video signal, in which it is suitable for realization of an IC and the fluctuation of the S/N ratio of the video signal can be precisely detected at a high response speed while suppressing the total costs to the low costs and a system based on the S/N ratio measuring method can be provided.

What is claimed is:

1. An apparatus for measuring an S/N ratio of a composite video signal, comprising:

a clamper setting a sync tip level of said composite video signal to a constant level;

a waveform shaper removing a portion carrying pure video information from said composite video signal to produce a composite sync signal having binary values;

a timing generator setting a predetermined period within a period of a vertical sync signal of said composite video signal; and a counter loading an initial value and starting counting said binarized composite sync signal upon starting of said predetermined period and producing a carry signal representing existence of noises when a maximum count value is reached, thereby providing a result of the detection in binary form.

2. An apparatus for measuring an S/N ratio of a composite video signal, comprising:

a clamper setting a sync tip level of said composite video signal to a constant level;

a waveform shaper removing a portion carrying pure video information from said composite video signal to produce a composite sync signal having binary values;

a gate circuit allowing transmission of said composite sync signal for a predetermined period within a period of a vertical sync signal of said composite video signal; and a counter starting counting of said binarized composite sync signal upon starting of said predetermined period and producing a count value representing a number of occurrence of noises in said composite sync signal when said predetermined period has elapsed, thereby providing a result of the detection in numerical form.

* * * * *